Nov. 29, 1949     W. J. MILLER     2,489,798
APPARATUS FOR POTTERY APPENDAGING
Original Filed March 1, 1929

INVENTOR
William J. Miller
BY
George J. Groninger
ATTORNEY

Patented Nov. 29, 1949

2,489,798

UNITED STATES PATENT OFFICE 2,489,798

APPARATUS FOR POTTERY APPENDAGING

William J. Miller, Pittsburgh, Pa., assignor to Miller Pottery Engineering Company, Swissvale, Pa., a corporation of Pennsylvania Application March 29, 1935, Serial No. 13,683, which is a division of application Serial No. 343,693, March 1, 1929. Divided and this application November 7, 1945, Serial No. 627,149

4 Claims. (Cl. 25—22)

This application is a division of my co-pending application, Serial No. 13,683, filed March 29, 1935 which is a division of my U. S. Patent 2,046,525, said patent being in turn a continuation in part of my U. S. Patent 1,838,277. It has to do with pottery appendaging apparatus.

Figure 1:
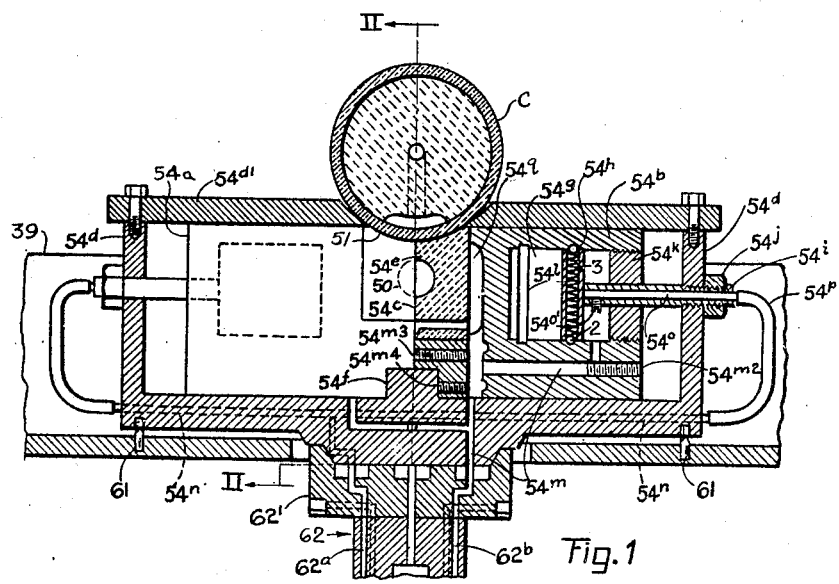
Figure 1 is a transverse, vertical sectional view of a partible appendage mold.
Figure 2:
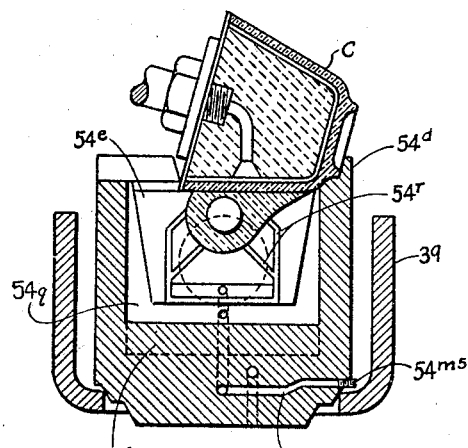
Figure 2 is a view taken on line II—II of Figure 1.

The appendaging unit, used for automatically applying handles and like appendages to the ware is generally indicated by the numeral 1 in the drawings and is shown in detail in Figures 1 and 2. The appendage mold is formed in two sections or parts 54a, 54b, which are of similar construction, these parts being normally closed at the joint 54c, only one of said parts being shown in section in Figure 1. The sections 54a and 54b have limited sliding movement in a frame 54d, said frame having a detachable cover 54d' formed with a ware-positioning seat which is preferably faced with felt or some similar substance, to compensate for shrinkage and prevent marring of the ware deposited therein. The sections 54a and 54b may be of any suitable material, preferably noncorrosive, and in the abutting portions thereof are cut away to receive and retain the two halves of a supplemental mold 54e which is of porous material and constitutes the mold per se in which the handle or appendage is formed, the two halves of this mold 54e also joining at 54c when the sections are in closed position. The recesses for the porous halves or sections of the mold per se are V-shaped, so that by removing the cover 54d', said mold may be removed and replaced by a mold for any desired appendage.

The frame 54d in line with the joint 54c is formed with a guide block 54f, which assists in guiding and positioning the sections 54a and 54b when closing, and the bottom of said frame is shaped to center on a vertically movable spotting chuck 62, which is shown in section in Figure 1. Vertical movement of the spotting chuck may be effected as shown and described in my parent application. Each of the sections 54a and 54b is bored or recessed to form a cylinder 54g, in which a relatively stationary piston 54h is mounted, said piston being provided with an exteriorly-threaded stem 54i which is formed with a bore 54o and threaded into the side of the frame 54d and secured by a nut 54j, the cylinder walls being interiorly threaded for removable application of a sealing head 54k.

The cylinder walls are formed with two annular spotting or positioning grooves 54l and the piston 54h is diametrically bored to receive a ball and spring detent assembly, the balls 2, which are pressed outwardly by a spring 3, registering with the grooves when the sections 54a and 54b reciprocate, to thereby resiliently retain said sections in their alternate positions.

The mold sections 54a and 54b together with the respective halves of the appendage or handle mold 54e are adapted to be alternately retracted from abutting relation or parted and moved together by means of valve controlled sub and super-atmospheric pressure, which is applied through the spotting chucks 62', see Figure 1.

Preliminary to the retracting operation, it is preferred to impregnate the porous mold 54e with super-atmosphere, to thus ensure prompt release of the ware from the mold when the retracting pressure is applied. There are, two independent hose connections shown, and two normally independent air passages 54m and 54n leading into and branching off in the mold sections 54a and 54b and mold 54e, the operating pressure being applied through the passage 54n and the impregnating atmospheric pressure, which is not limited to super-atmosphere but may be any desired treating medium or fluid, applied through the passage 54m. The bore or passage 54o in the piston stem is connected with the passage 54n by a hose or analogous member 54p, and is also connected with the passage 62a formed in the spotting chuck 62. The passage 62a connects with an air line leading to a control valve. The passage 54m registers with a passage 62b also formed in the chuck 62 and connecting with an air line also leading to one of said valves. The passage 54m branches off and terminates in chambers 54q formed in the sections 54a and 54b on each side of the mold 54e, and also branches off into the piston chamber, this latter branch passage being used when it is desired to use the passage 54m for applying both the impregnating pressure and operating pressure and is adjustably closed in the present instance by a threaded plug 54m2. The chambers 54q, only one of which is visible, communicate with branch passages formed in the sections 54e of the mold and terminating at the joint of the latter. The branch of the passage 54m leading to the chamber 54q may be adjusted through the medium of a screw plug 54m3, and communication to the chuck passage 62b may be closed by a screw plug 54m4, these plugs being inserted in each section 54a and 54b. The passage 54m also branches off and opens out in the side of the mold, see Figure 2, which branch is shown closed by a screw plug 54m5.

When it is desired to apply fluid pressure from another source instead of through the chuck passage 62b, the branch passage leading to 62b is closed and the plug 54m5 replaced by a hose nipple. The bore 54o in the piston stem 54i terminates in the cylinder 54g on either side of the piston 54h, depending upon the position of a screw plug 54o', this plug being shown in the side of said stem, the sections being retracted in the present instance by sub-atmospheric pressure and closed by super-atmospheric pressure, whereas, if the plug 54o' were inserted in the end of said section, this action would be reversed. To ensure communication with the mold cavity of the porous mold 54e, the abutting surfaces of the respective halves of the latter are grooved as at 54r, to provide vents leading to the mold cavity.

The appendaging units 1 are carried by trays 39 formed as part of a conveyor that is moved intermittently to carry the trays 39 and the appendaging units from station to station, that is to say, from a mold filling station to a mold opening and emptying station, as well as other stations which are more particularly described in the parent application.

At the mold filling station, the cavity 50 of the appendaging unit is filled with liquid slip clay by means of an automatic charger which is fully described in the parent application. A cup C to be appendaged is then automatically placed on the ware receiving surface of the mold, all as described in complete detail in the parent application.

After the ware has been placed on the mold, the ware and mold are transported to a location or locations, where the operations of opening the mold and removing the ware are performed. During the interval the ware and mold are traveling in association, the liquid slip in the molding cavity 50, which in Figure 1 appears as the cross section of a cup handle, becomes hardened and attached to the ware, thereby forming the appendage.

Inasmuch as the mold may be treated with various fluid mediums for various purposes as hereinbefore explained, means are provided for connecting the various air and fluid pressures of the appendaging unit with sources of supply at the mold filling location and at the mold emptying and mold opening locations. The means of connecting the appendaging unit with sources of fluid supply or vacuum takes the form of the chuck 62' hereinbefore mentioned.

The passage of air under pressure or various fluid mediums or the creation of vacuum in either one of these passages, is controlled automatically as disclosed in my parent application. However, the operation is such that when a tray bearing an appendaging unit reaches either a mold filling or mold emptying position, a chuck 62' is moved into cooperation with the appendaging unit and fluid or vacuum automatically applied to the appendaging unit for the purposes hereinbefore described. 61 are pins for centering the frame 54d on tray 39.

What I claim is:

1. Apparatus for appendaging potteryware comprising, a frame formed with a seat, a support for the frame, an appendage mold carried by said frame and formed of separable parts, fluid operated means including cylinders and pistons for actuating said separable parts of said mold, fluid passages leading from said cylinders to inlets in said seat, a vertically-movable chuck for lifting the frame from the support having a seat for cooperation with the frame seat, and fluid passages leading through said chuck having outlets arranged to register with said inlets, when the chuck is raised.

2. Apparatus for appendaging potteryware, comprising a frame having a bottom portion provided with a chuck-engaging seat, a support for the frame, a separable appendage mold carried by said frame, fluid pressure operated means for opening and closing said mold, conduits leading from said fluid pressure operated means to inlets in the bottom portion of the frame, and a vertically-movable chuck having a seat for engaging said frame, and having fluid conduits leading to outlets in said chuck seat, vertical movements of said chuck being effective to lift the frame from the support and bring said outlets of the chuck into register with said inlets of the frame.

3. Pottery appendaging apparatus comprising, a movable support, a frame carried by said support and provided with a chuck seat, a separable appendage mold formed of sections carried by the frame, a chuck vertically movable into a position below the frame seat and to lift the frame from the support, air operated means for actuating said mold sections, and conduits in said frame and said chuck arranged to register with each other when the frame is lifted from the support by the chuck for supplying air to said air operated means.

4. In apparatus of the class specified, the combination with a vertically movable chuck formed with air passages, of a frame, a partable mold in the frame for forming appendages comprising separable mold sections each provided interiorly with a chamber, pistons mounted in said chambers and connected to the frame in stationary positions, said mold sections being provided with air passages which register with the passages formed in said chuck when the chuck is moved into engagement with the mold, and means for applying sub- and super-atmospheric pressure to said chambers through said passages to open and close the mold.

WILLIAM J. MILLER.

REFERENCES CITED

The following references are of record in the file of this patent:

UNITED STATES PATENTS

| Number | Name | Date |
| --- | --- | --- |
| 1,838,277 | Miller | Dec. 29, 1931 |
| 2,946,525 | Miller | July 7, 1936 |

Certificate of Correction

Patent No. 2,489,798 — November 29, 1949

WILLIAM J. MILLER

It is hereby certified that error appears in the printed specification of the above numbered patent requiring correction as follows:

Column 4, line 65, list of references cited, for the patent number "2,946,525" read *2,046,525*;

and that the said Letters Patent should be read with this correction therein that the same may conform to the record of the case in the Patent Office.

Signed and sealed this 18th day of April, A. D. 1950.

[SEAL]

THOMAS F. MURPHY,
*Assistant Commissioner of Patents.*